(12) United States Patent
Shin et al.

(10) Patent No.: US 12,148,954 B2
(45) Date of Patent: Nov. 19, 2024

(54) HV BUSBAR MADE OF DISSIMILAR METALS AND METHOD OF MANUFACTURING THE SAME

(71) Applicant: LG ENERGY SOLUTION, LTD., Seoul (KR)

(72) Inventors: Ju Hwan Shin, Daejeon (KR); Hyoung Suk Lee, Daejeon (KR); Dong Hyun Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 112 days.

(21) Appl. No.: 17/781,240

(22) PCT Filed: Mar. 4, 2021

(86) PCT No.: PCT/KR2021/002658
§ 371 (c)(1),
(2) Date: May 31, 2022

(87) PCT Pub. No.: WO2021/201446
PCT Pub. Date: Oct. 7, 2021

(65) Prior Publication Data
US 2022/0407188 A1    Dec. 22, 2022

(30) Foreign Application Priority Data
Mar. 31, 2020    (KR) .................. 10-2020-0039086

(51) Int. Cl.
*H01M 50/505*    (2021.01)
*H01B 13/00*    (2006.01)
(Continued)

(52) U.S. Cl.
CPC ...... *H01M 50/505* (2021.01); *H01B 13/0016* (2013.01); *H01B 13/0036* (2013.01);
(Continued)

(58) Field of Classification Search
CPC ............ H01B 13/0016; H01B 13/0036; H01B 13/165; H01M 2200/10; H01M 50/505;
(Continued)

(56) References Cited

U.S. PATENT DOCUMENTS 1,943,913 A * 1/1934 Cohen .................. F16L 5/06
242/384.7
2,375,917 A * 5/1945 Gross ................... H02G 11/02
242/385.1

(Continued)

FOREIGN PATENT DOCUMENTS

CN         1175488 A      3/1998
CN       103460447 A     12/2013
(Continued)

OTHER PUBLICATIONS

International Search Report (PCT/ISA/210) issued in PCT/KR2021/002658, dated Jun. 10, 2021.
(Continued)

*Primary Examiner* — Timothy J Thompson
*Assistant Examiner* — Rhadames Alonzo Miller
(74) *Attorney, Agent, or Firm* — Birch, Stewart, Kolasch & Birch, LLP (57) ABSTRACT

An HV busbar configured to connect a plurality of battery modules to each other, has a conductor including a first metal plate and a second metal plate and an insulative resin coating layer on the outer circumferential surface of the conductor, wherein a first metal constituting the first metal plate and second metals having a lower melting temperature than the first metal are mixed in the second metal plate in the state in which the second metals are dispersed.

13 Claims, 9 Drawing Sheets

(51) Int. Cl.
*H01B 13/16* (2006.01)
*H01M 50/522* (2021.01)
*H01M 50/524* (2021.01)
*H01M 50/526* (2021.01)

(52) U.S. Cl.
CPC ....... *H01M 50/522* (2021.01); *H01M 50/524* (2021.01); *H01M 50/526* (2021.01); *H01B 13/165* (2013.01)

(58) Field of Classification Search
CPC ............. H01M 50/507; H01M 50/522; H01M 50/524; H01M 50/526; H01M 50/581; Y02E 60/10
See application file for complete search history.

(56) References Cited

U.S. PATENT DOCUMENTS

| | | | | |
|---|---|---|---|---|
| 3,600,500 | A * | 8/1971 | Schoerner | H01B 7/182 174/115 |
| 3,968,587 | A * | 7/1976 | Kammeraad | A01K 91/08 43/43.12 |
| 4,156,320 | A * | 5/1979 | Kammeraad | A01K 91/08 242/399.2 |
| 4,181,047 | A * | 1/1980 | Bitting | H01B 13/0003 81/9.51 |
| 4,199,854 | A * | 4/1980 | Bitting | H01B 15/005 81/9.51 |
| 4,454,999 | A * | 6/1984 | Woodruff | B65H 49/34 242/397.2 |
| 4,743,512 | A | 5/1988 | Marlowe et al. | |
| 4,758,536 | A * | 7/1988 | Miller | H01R 13/4536 439/686 |
| 4,775,328 | A * | 10/1988 | McCarthy | H01R 25/006 439/211 |
| 4,794,691 | A * | 1/1989 | Brandeau | H01R 12/78 439/495 |
| 4,830,300 | A * | 5/1989 | Taylor | B65H 54/58 254/378 |
| 4,948,065 | A * | 8/1990 | Zelmin | B65H 75/4431 242/381.6 |
| 5,053,583 | A * | 10/1991 | Miller | H01B 11/20 174/32 |
| 5,094,396 | A * | 3/1992 | Burke | H04M 1/15 242/375 |
| 5,097,099 | A * | 3/1992 | Miller | H01B 11/1008 174/117 M |
| 5,245,134 | A * | 9/1993 | Vana, Jr. | H01B 11/203 385/112 |
| 5,296,648 | A * | 3/1994 | Johnson | H05B 3/56 174/117 F |
| 5,385,314 | A * | 1/1995 | Hughes | B65H 54/2866 242/397.3 |
| 5,535,960 | A * | 7/1996 | Skowronski | H04M 1/15 242/378.4 |
| 5,631,619 | A | 5/1997 | Evans | |
| 5,850,591 | A | 12/1998 | Sugikawa | |
| 5,913,488 | A * | 6/1999 | Miho | B65H 75/44 439/15 |
| 6,179,104 | B1 * | 1/2001 | Steinmuller | B65H 75/4431 191/12.4 |
| 6,241,063 | B1 * | 6/2001 | Van Ess | H02G 11/02 191/12.2 A |
| 6,372,988 | B1 * | 4/2002 | Burke | B65H 75/4449 242/360 |
| 6,578,683 | B1 * | 6/2003 | Burke | H04M 1/15 191/12.4 |
| 6,609,334 | B1 * | 8/2003 | Gutermuth | E05F 11/488 49/226 |
| 7,559,501 | B2 * | 7/2009 | Jian | B65H 75/4492 242/395 |
| 7,976,052 | B1 * | 7/2011 | Williams, Jr. | B60D 1/40 280/445 |
| 9,249,921 | B1 * | 2/2016 | Wurtenberger | F16M 11/046 |
| 9,371,217 | B1 * | 6/2016 | DePumpo | B66F 9/075 |
| 10,672,534 | B1 * | 6/2020 | Abernathy | H01B 7/225 |
| 2002/0062974 | A1 * | 5/2002 | Curro | B32B 5/26 156/229 |
| 2002/0113685 | A1 | 8/2002 | Izaki et al. | |
| 2003/0000788 | A1 * | 1/2003 | Skowronski | H02G 11/02 191/12.2 R |
| 2003/0221507 | A1 * | 12/2003 | Wessel | B62M 25/045 74/502.2 |
| 2004/0129522 | A1 * | 7/2004 | Skowronski | H02G 11/02 191/12.2 R |
| 2004/0200919 | A1 * | 10/2004 | Burke | H02G 11/02 242/378.1 |
| 2006/0024996 | A1 * | 2/2006 | Johnson | H02G 3/00 439/215 |
| 2006/0035499 | A1 * | 2/2006 | Johnson | H02G 3/00 439/215 |
| 2006/0053845 | A1 * | 3/2006 | Benda | F16K 35/12 70/18 |
| 2006/0085974 | A1 * | 4/2006 | Anderson | H02G 1/08 29/721 |
| 2006/0131059 | A1 * | 6/2006 | Xu | H01B 3/427 174/117 F |
| 2007/0240898 | A1 * | 10/2007 | Reichert | H01B 7/0838 174/117 FF |
| 2007/0257146 | A1 * | 11/2007 | Fleming | B65H 75/28 242/396 |
| 2008/0007880 | A1 * | 1/2008 | Bradley | H02H 11/002 361/42 |
| 2008/0210330 | A1 * | 9/2008 | Anderson | B65H 49/321 140/147 |
| 2009/0230228 | A1 * | 9/2009 | Penumatcha | G02B 6/4457 242/603 |
| 2010/0078847 | A1 * | 4/2010 | Lind | H02G 3/0462 264/171.13 |
| 2010/0322811 | A1 | 12/2010 | Hodjat et al. | |
| 2011/0061981 | A1 * | 3/2011 | Ori | B60L 53/65 191/12.2 R |
| 2011/0183537 | A1 * | 7/2011 | Fornage | H01R 13/639 439/271 |
| 2012/0126047 | A1 * | 5/2012 | Skowronski | H02G 11/02 242/388.6 |
| 2012/0227447 | A1 * | 9/2012 | Conti | E05B 73/0052 29/407.01 |
| 2012/0312910 | A1 * | 12/2012 | Lokkinen | B08B 9/045 242/390.5 |
| 2013/0075522 | A1 * | 3/2013 | Penumatcha | B65H 75/14 242/614 |
| 2013/0225005 | A1 * | 8/2013 | Fornage | H01R 12/592 439/658 |
| 2013/0284843 | A1 * | 10/2013 | Mertesdorf | B65H 75/4471 242/397 |
| 2013/0323549 | A1 * | 12/2013 | Choi | H01M 50/507 429/62 |
| 2014/0038471 | A1 | 2/2014 | Yang et al. | |
| 2014/0065467 | A1 * | 3/2014 | Choi | H01M 50/583 174/68.2 |
| 2014/0299704 | A1 * | 10/2014 | Hollowed | H02G 11/02 242/371 |
| 2014/0377983 | A1 * | 12/2014 | Laube | B65H 75/4431 242/160.4 |
| 2015/0102151 | A1 * | 4/2015 | Skowronski | H02G 11/02 242/394 |
| 2015/0108267 | A1 * | 4/2015 | Guiffault | B65H 75/4471 242/588.2 |
| 2015/0279520 | A1 | 10/2015 | Koda | |
| 2016/0012941 | A1 * | 1/2016 | Ledwith | H02G 11/02 156/280 |
| 2016/0048896 | A1 * | 2/2016 | Lind | G06Q 30/0621 705/26.5 |
| 2016/0114429 | A1 * | 4/2016 | Shioga | B23K 26/0006 219/121.65 |
| 2016/0121747 | A1 * | 5/2016 | Jefferies | B60L 53/16 320/109 |

(56) References Cited

U.S. PATENT DOCUMENTS

| | | | |
|---|---|---|---|
| 2016/0151853 A1* | 6/2016 | Lee | B23K 26/22 |
| | | | 219/121.64 |
| 2016/0229663 A1* | 8/2016 | Alford | H01B 7/00 |
| 2016/0240342 A1* | 8/2016 | Yoneda | H01H 85/08 |
| 2017/0054132 A1* | 2/2017 | Ma | H01M 50/505 |
| 2017/0090139 A1* | 3/2017 | Gronvall | G02B 6/4457 |
| 2018/0269673 A1* | 9/2018 | Alford | H02G 11/02 |
| 2018/0309281 A1 | 10/2018 | Ichikawa et al. | |
| 2018/0361708 A1 | 12/2018 | Hirano | |
| 2018/0375591 A1* | 12/2018 | Sipes, Jr. | H04L 12/10 |
| 2019/0043109 A1* | 2/2019 | Lind | G06Q 30/0633 |
| 2019/0048666 A1* | 2/2019 | Orban | E21B 15/00 |
| 2019/0051431 A1* | 2/2019 | Orban | H01B 9/003 |
| 2019/0094643 A1 | 3/2019 | Friedman et al. | |
| 2019/0256320 A1* | 8/2019 | Hinojosa | H02G 11/02 |
| 2019/0278040 A1* | 9/2019 | Geens | G02B 6/4457 |
| 2019/0304621 A1 | 10/2019 | Velthuis et al. | |
| 2019/0371490 A1* | 12/2019 | Hunter | H01B 7/0823 |
| 2020/0166723 A1* | 5/2020 | Gronvall | G02B 6/4457 |
| 2020/0168887 A1 | 5/2020 | Yoo et al. | |
| 2021/0065929 A1* | 3/2021 | Kojima | H01B 7/0838 |
| 2021/0159685 A1* | 5/2021 | Alford | H02G 11/02 |
| 2021/0166836 A1* | 6/2021 | Nagano | H01B 11/1091 |
| 2021/0359380 A1* | 11/2021 | Murata | H01M 50/553 |
| 2023/0065133 A1* | 3/2023 | Shin | H01M 50/204 |

FOREIGN PATENT DOCUMENTS

| | | |
|---|---|---|
| CN | 103650209 A | 3/2014 |
| EP | 3 337 304 A1 | 6/2018 |
| JP | 62-107347 U | 7/1987 |
| JP | 4-341508 A | 11/1992 |
| JP | 11-503864 A | 3/1999 |
| JP | 3478785 B2 | 12/2003 |
| JP | 2014-107201 A | 6/2014 |
| JP | 2014-519153 A | 8/2014 |
| JP | 2015-76295 A | 4/2015 |
| JP | 2015-519715 A | 7/2015 |
| JP | 2018-181780 A | 11/2018 |
| JP | 6454262 B2 | 1/2019 |
| KR | 10-1989-0014774 A | 10/1989 |
| KR | 10-2012-0027407 A | 3/2012 |
| KR | 10-2013-0059301 A | 6/2013 |
| KR | 10-1274720 B1 | 6/2013 |
| KR | 10-2013-0080023 A | 7/2013 |
| KR | 10-1463198 B1 | 11/2014 |
| KR | 10-2015-0121519 A | 10/2015 |
| KR | 101760397 B1 * | 9/2016 |
| KR | 10-2016-0086853 A | 6/2018 |
| KR | 10-2015-0062694 A | 8/2018 |
| KR | 10-2019-0096674 A | 6/2019 |
| KR | 10-2021-0050255 A | 6/2021 |

OTHER PUBLICATIONS

Braunovic, "Overheating of Flexible Tinned Copper Connectors," IEEE, Institute of Electrical and Electronics Engineers, XP032158564, Sep. 25, 2000, pp. 67-72.

Extended European Search Report for European Application No. 21782031.5, dated Aug. 2, 2024.

* cited by examiner

[FIG. 1]

Conventional Art

Conventional Art

HV BUSBAR MADE OF DISSIMILAR METALS AND METHOD OF MANUFACTURING THE SAME

TECHNICAL FIELD

This application claims the benefit of priority to Korean Patent Application No. 2020-0039086 filed on Mar. 31, 2020, the disclosure of which is incorporated herein by reference in its entirety.

The present invention relates to an HV busbar made of dissimilar metals and a method of manufacturing the same, and more particularly to an HV busbar that is capable of securely interrupting the flow of current while having high resistance to external impact and that is capable of easily adjusting current cutoff temperature in a battery pack and a method of manufacturing the same.

BACKGROUND ART

With technological development of mobile devices, such as mobile phones, laptop computers, camcorders, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), and a plug-in hybrid electric vehicle (P-HEV), and therefore there is an increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of being freely charged and discharged, has a very low self-discharge rate, and has high energy density, compared to the nickel-based secondary batteries.

Meanwhile, a secondary battery used for small devices includes several battery cells. For vehicles, however, a plurality of battery modules is electrically connected to each other using a high voltage busbar (HV busbar) in order to increase capacity and output thereof. The HV busbar may be classified as a rigid busbar or a flexible busbar. The flexible busbar is frequently used to connect various electronic devices to each other, in addition to connection between battery modules in series or in parallel. In particular, the flexible busbar is applied to a complicated path having a narrow or bent space.

Figure 1:
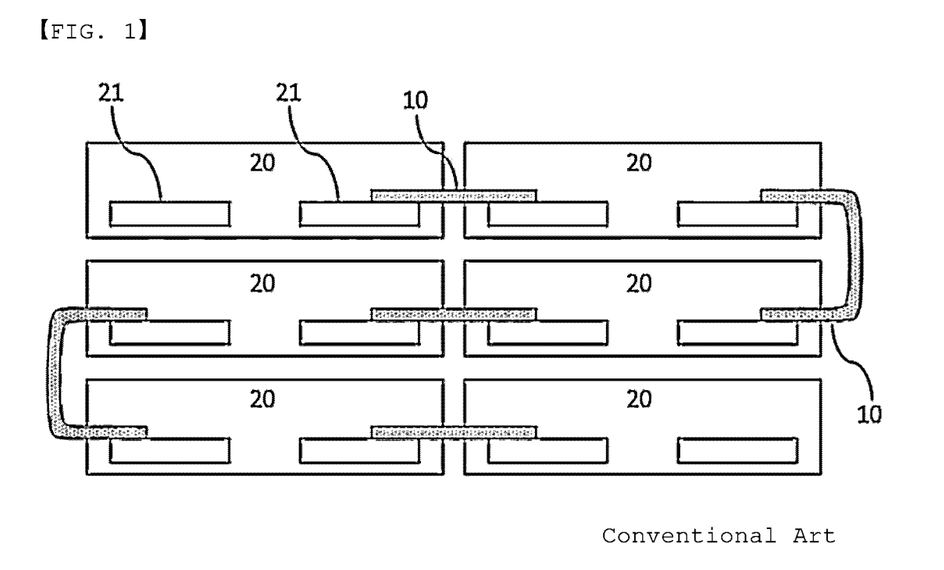
FIG. 1 is a conceptual view of a conventional battery pack.
Figure 2:
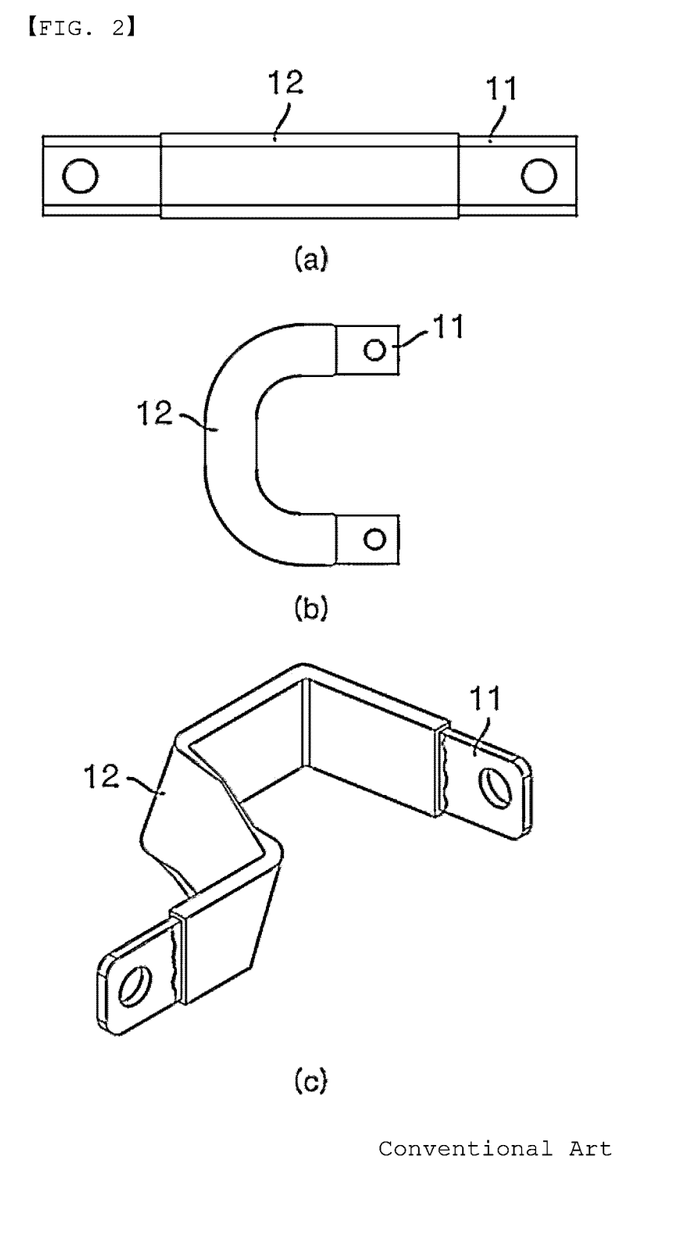
FIG. 2 is an external perspective view of a conventional HV busbar.

FIG. 1 is a conceptual view of a conventional battery pack, and FIG. 2 is an external perspective view of a conventional HV busbar.

As shown in FIG. 1, in a battery pack including a total of six battery modules 20, terminals 21 of the battery modules 20 that are horizontally arranged are located on the same plane, whereby a general rigid flat HV busbar 10 shown (a) of FIG. 2 is used. When terminals 21 of the battery modules 20 that are vertically arranged are connected to each other, a flexible HV busbar 10 shown in (b) of FIG. 2 is adopted. In the case in which a path for electrical connection between the battery modules 20 is further complicated, an HV busbar 10 having a shape shown in (c) of FIG. 2 may be adopted.

In general, the HV busbar 10 includes a metal plate having a predetermined thickness and width and an insulative resin coating layer 12 provided so as to wrap the outer surface of the metal plate 11.

Meanwhile, in the case in which high current flows in a battery pack due to exposure to high temperature, overcharging, external short circuit, needle penetration, or local damage, heat may be generated in a battery, whereby the battery may explode. For this reason, manual service disconnect (MSD), which is called a safety plug, and a fuse are generally mounted, whereby part expenses and volume of the battery pack are increased.

In connection therewith, Patent Document (Korean Patent Application Publication No. 2015-0062694) discloses a part for secondary batteries installed on a path of current flowing in a secondary battery, wherein the part includes a metal plate having a slit formed in a lateral direction and a metal bridge having a lower melting point than the metal plate, the metal bridge being joined to the metal plate in a state of filling the slit.

The above patent document has an advantage in that, in the case in which overcurrent flows in the secondary battery, the part installed on the path of current flowing in the secondary battery is rapidly ruptured, whereby overcurrent is interrupted, and therefore safety in use of the secondary battery is secured, but has problems in that it is not easy to join the metal plate and the metal bridge to each other, since the metal plate and the metal bridge are dissimilar metals, and therefore the metal bridge must be joined to the metal plate so as to wrap the regions of the upper surface and the lower surface of the metal plate that are adjacent to the slit, whereby the part is structurally unstable, has low resistance to external impact, and is not easy to manufacture.

PRIOR ART DOCUMENTS (Patent Document 1) Korean Patent Application Publication No. 2015-0062694

DISCLOSURE

Technical Problem

The present invention has been made in view of the above problems, and it is an object of the present invention to provide an HV busbar capable of securely interrupting the flow of current even in the case in which the temperature of a battery pack is abnormally increased and a method of manufacturing the same.

It is another object of the present invention to provide an HV busbar that has high resistance to external impact and that is easy to manufacture and a method of manufacturing the same.

Technical Solution

In order to accomplish the above objects, a busbar configured to connect a plurality of battery modules to each other according to the present invention includes a conductor including at least one first metal plate and a second metal plate having a different composition than the at least one first metal plate and an insulative resin coating layer on the outer circumferential surface of the conductor, wherein the at least one first metal plate comprises a first metal and the second metal plate comprises second metals dispersed within the first metal, the second metals having a lower melting point than the first metal.

Also, in the busbar according to the present invention, the upper surface and the lower surface of each of the second metals may be exposed out of the second metal plate, and the side surface of each of the second metals may be in contact with the first metal.

Also, in the busbar according to the present invention, the second metals may have different outer surface areas.

Also, in the busbar according to the present invention, when heated to a predetermined temperature or higher, the second metals may be melted, whereby the sectional area of the second metal plate may be reduced.

Also, in the busbar according to the present invention, when heated to a predetermined temperature or higher, a rupture portion may be formed in the second metal plate.

Also, in the busbar according to the present invention, the first metal may be copper or aluminum, and the second metals may include at least one of indium (In) and tin (Sn).

Also, in the HV busbar according to the present invention, the at least one first metal plate may be two first metal plates, the second metal plate may be a singular plate, and the second metal plate may be located between the first metal plates.

Also, in the busbar according to the present invention, the first metal plates and the second metal plate may be alternately located in a longitudinal direction, and the first metal plates may be located at opposite edges in the longitudinal direction.

In addition, a busbar manufacturing method according to the present invention includes applying a predetermined temperature and pressure to first metal powder while continuously supplying the first metal powder to form the at least one first metal plate, applying a predetermined temperature and pressure to a metal powder mixture of first metal powder and second metal powder while continuously supplying the metal powder mixture for a predetermined time to form the second metal plate, and applying a predetermined temperature and pressure to the first metal powder while continuously supplying the first metal powder to form the at least one first metal plate, thereby preparing a conductor.

Also, in the HV busbar manufacturing method according to the present invention, the first metal powder may be copper or aluminum, and the second metal powder may be an alloy of indium (In) and tin (Sn).

Also, in the HV busbar manufacturing method according to the present invention, the particle size of the second metal powder may be greater than the particle size of the first metal powder.

Also, the HV busbar manufacturing method according to the present invention may further include cutting the conductor to a predetermined length and coating the remaining surfaces of the conductor excluding opposite edges thereof with an insulative resin.

In addition, the present invention provides a battery pack including the HV busbar.

Advantageous Effects

In an HV busbar according to the present invention and a method of manufacturing the same, a second metal plate, which is made of a mixture of a first metal and a second metal having a lower melting temperature than the first metal, is located between first metal plates, each of which is made of a first metal, whereby the first metal plate and the second metal plate are strongly coupled to each other, and therefore the HV busbar has high resistance to external impact.

Also, in the HV busbar according to the present invention and the method of manufacturing the same, when the temperature of a battery pack is increased to a melting temperature of the second metal, a predetermined region of the second metal plate is ruptured, whereby the flow of current is interrupted. Consequently, it is possible to easily adjust current cutoff temperature by changing the kind of the second metal.

Furthermore, in the HV busbar according to the present invention and the method of manufacturing the same, the HV busbar also serves as a fuse, whereby it is possible to omit a separate fuse and manual service disconnect (MSD) in the battery pack, and therefore it is possible to reduce manufacturing costs together with improvement in energy density.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Meanwhile, an HV busbar according to the present invention is defined as a busbar configured to electrically connect battery modules to each other, to electrically connect a battery module and a vehicle connector to each other, or to electrically connect battery packs to each other.

Hereinafter, an HV busbar made of dissimilar metals according to the present invention and a method of manufacturing the same will be described. As described with reference to FIGS. 1 and 2, the HV busbar according to the present invention, which is an HV busbar configured to connect a plurality of battery modules to each other, may be rigid or flexible and may be formed so as to have various shapes, and the outer surface of a metal plate constituting a conductor may be coated with an insulative resin.

Figure 3:
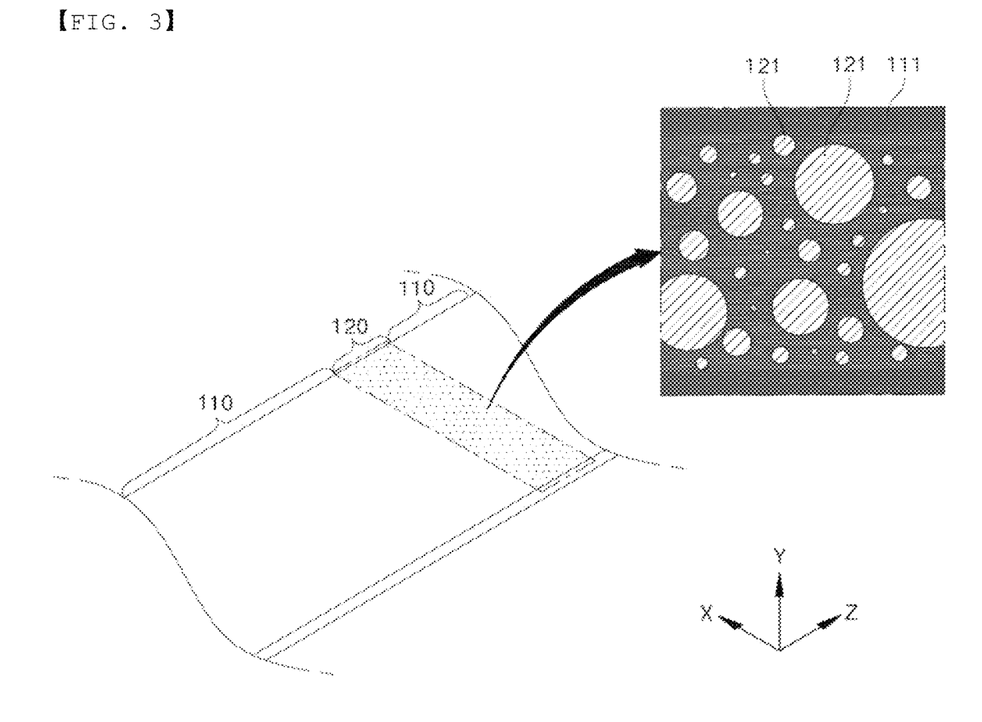
FIG. 3 is a conceptual view of an HV busbar according to a first preferred embodiment of the present invention.
Figure 4:
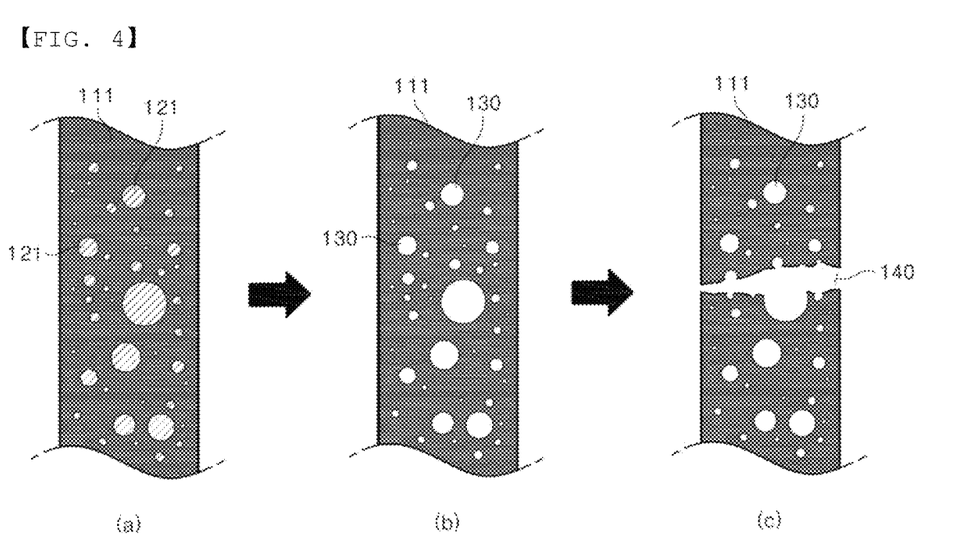
FIG. 4 is a conceptual view illustrating rupture of the HV busbar according to the present invention.

FIG. 3 is a conceptual view of an HV busbar according to a first preferred embodiment of the present invention, and FIG. 4 is a conceptual view illustrating rupture of the HV busbar according to the present invention.

The HV busbar 100, which electrically connects terminals of battery modules to each other, is configured in a flat shape having a predetermined thickness (Y-axis direction), a predetermined width (X-axis direction), and a predetermined length (Z-axis direction), and includes a first metal plate 110 corresponding to a non-cutting region and a second metal plate 120 corresponding to a cutting region.

In addition to a first metal constituting the first metal plate 110, the second metal plate 120 further includes a second metal having a different melting temperature from the first metal constituting the first metal plate. That is, second metals 121 having the same outer surface area or different outer surface areas are present in the second metal plate 120 in a dispersed state.

Here, that the second metals 121 are dispersed in the second metal plate 120 means that the second metals 121 having predetermined sizes and surface areas are completely inserted or impregnated in a thickness direction of the second metal plate 120 (Y-axis direction) regularly or irregularly. That is, the second metals 121 are exposed outwards from the upper surface and the lower surface of the second metal plate 120, whereas the side surface of each of the second metals is in completely tight contact with the first metal constituting the first metal plate 110.

Of course, the portions of the second metals 121 exposed from the upper and lower surfaces of the second metal plate 120 are present in a flat state, although the second metals may maintain the original shape at the time of manufacture thereof, such as a spherical shape or a needle shape.

In the case in which the first metal plate 110 constituting the HV busbar 100 is coupled to a positive electrode lead, it is preferable for the first metal plate to be made of an aluminum (Al) material generally used for the positive electrode lead. The reason for this is that it is possible to improve weldability and to minimize contact resistance at a coupling portion. In the same manner, it is preferable that, in the case in which the first metal plate 110 is coupled to a negative electrode lead, the first metal plate be made of copper (Cu) or a copper material coated with nickel (Ni) generally used for the negative electrode lead. However, the material is not particularly restricted as long as the material exhibits bondability and conductivity.

The second metal plate 120 may be made of a metal having a lower melting temperature than aluminum (Al) or copper (Cu) constituting the first metal plate 110, such as indium (In), tin (Sn), or an alloy thereof. The reason for this is that, in the case in which the battery module is overheated due to short circuit or overcharging, it is necessary to rapidly rupture the HV busbar 100 in order to release electrical connection of the battery module. The second metals may be freely changed depending on a desired current cutoff temperature.

That is, as shown in FIG. 4, when the battery module is normally operated, current flows via the flat HV busbar 100 ((a) of FIG. 4). When the battery module is overheated to a melting temperature or higher of the second metals 121 due to short circuit in the battery module, however, the second metals 121, each of which has a relatively low melting temperature, are melted first, whereby pores 130 are formed in the portions at which the second metals 121 have been present (see (b) of FIG. 4). As a result, a rupture portion 140 is formed in a predetermined region, i.e. a region at which the second metals 121 are located adjacent to each other, whereby the HV busbar 100 is ruptured (see (c) of FIG. 4).

Here, the technical principle by which rupture occurs based on the pores 130, in which the second metals 121 have been present, will be described in brief. When the second metals 121 are melted and thus the pores 130 are formed, the surface area in which current is movable is reduced in the vicinity of the pores 130, whereby resistance is increased. Consequently, heat is abruptly generated based on the region in which the pores 130 are formed, whereby the temperature of a first metal 111 is increased to the melting temperature thereof. As a result, the first metal connecting the pores 130 to each other is also melted, whereby the rupture portion 140 is formed in the second metal plate 120 and thus the second metal plate is cut.

Meanwhile, it is preferable for the second metals 121 to be present so as to have a surface area equivalent to 20 to 90% of the surface area of the HV busbar 100 in the region thereof in the lateral direction (X-axis direction), the longitudinal direction (Z-axis direction), and the thickness direction (Y-axis direction) of the HV busbar. In the case in which the surface area of the second metals is less than 20% of the surface area of the HV busbar, time taken until the HV busbar is ruptured is too long. In the case in which the surface area of the second metals is greater than 90% of the surface area of the HV busbar, the HV busbar 100 may be ruptured by temporary overheating. Consequently, the above range is desirable.

Here, the second metals 121 may be located within a range of 5 to 10 mm in the longitudinal direction (Z-axis direction) of the HV busbar 100.

Figure 5:
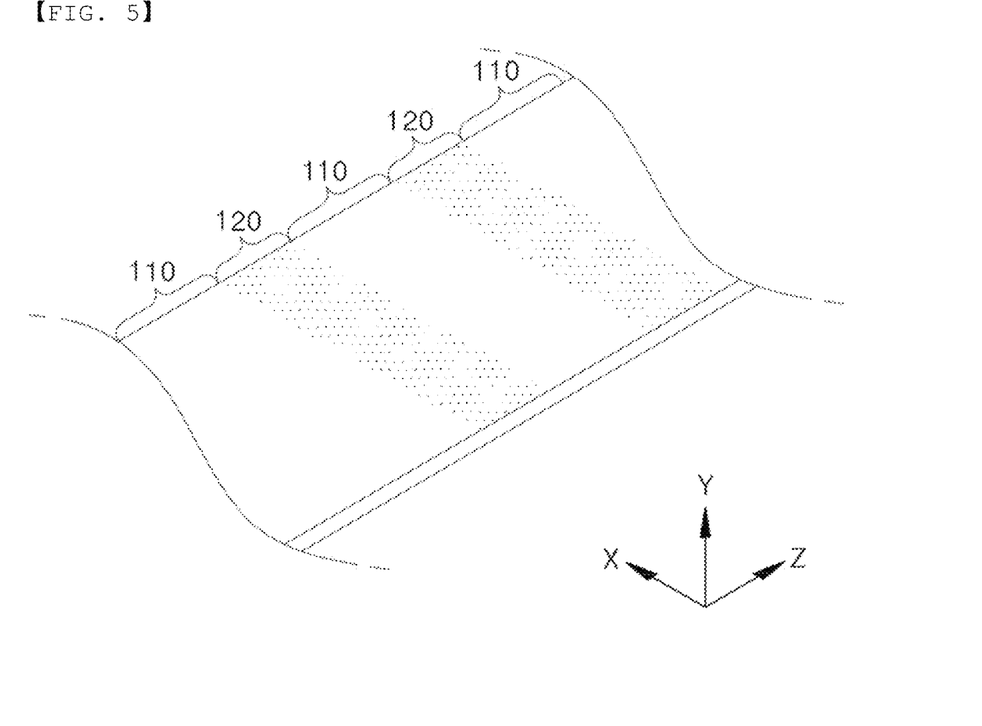
FIG. 5 is a conceptual view of an HV busbar according to a second preferred embodiment of the present invention.

Next, a second preferred embodiment of the present invention will be described. FIG. 5 is a conceptual view of an HV busbar according to a second preferred embodiment of the present invention.

The second embodiment is identical in construction to the first embodiment except that two second metal plates 120 are provided at the HV busbar 100 so as to be spaced apart from each other by a predetermined distance. Hereinafter, therefore, only different constructions will be described.

In the case in which two second metal plates 120, each of which includes second metals 121, are provided so as to be spaced apart from each other by a predetermined distance, it is possible to further increase a safety factor. That is, in the case in which one second metal plate 120 is provided, relatively long time is incurred until the HV busbar is ruptured or the occurrence of short circuit may be inhibited. In the case in which two second metal plates 120 are present at the HV busbar 100, however, it is possible to more securely induce rupture of the HV busbar. Although two second metal plates 120 are shown in FIG. 5, which is merely an illustration, it is obvious that three or more second metal plates may be provided.

Next, a method and apparatus for manufacturing the HV busbar according to the first embodiment of the present invention described above will be described.

Figure 6:
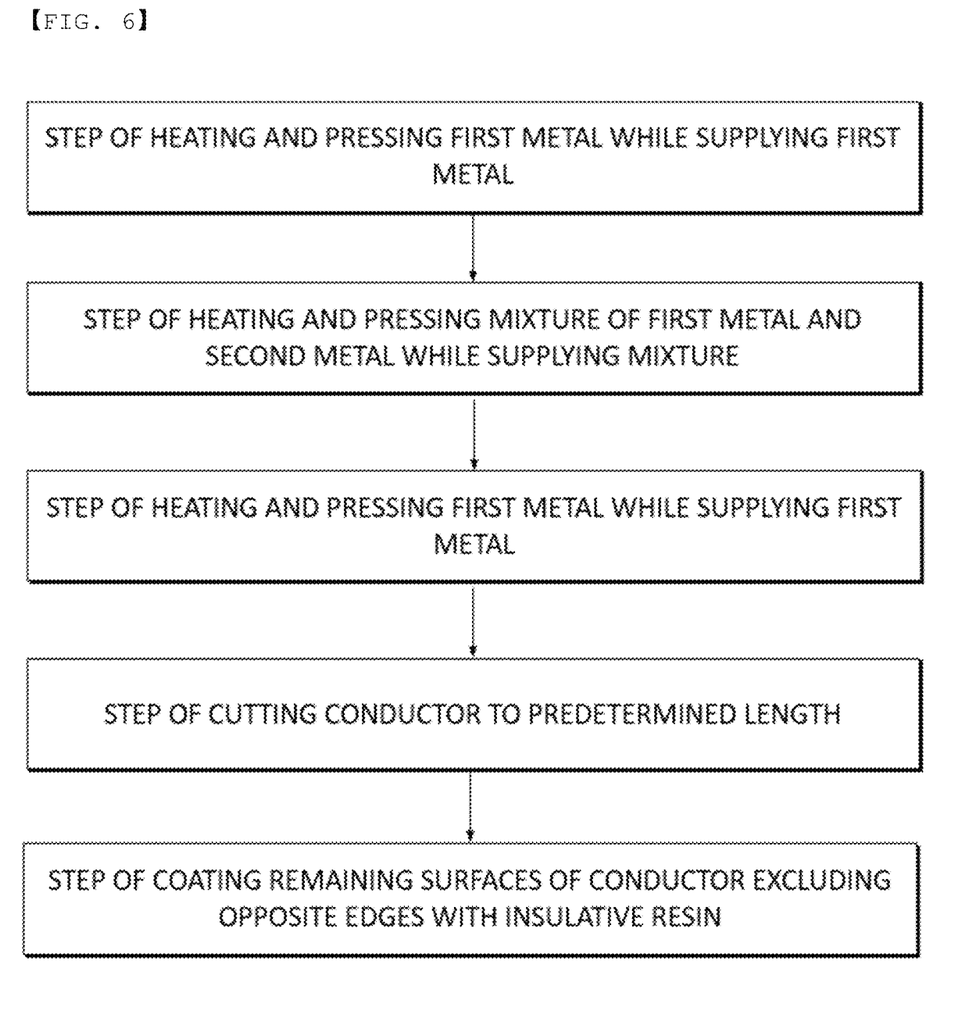
FIG. 6 is a flowchart illustrating a method of manufacturing the HV busbar according to the first preferred embodiment of the present invention.
Figure 7:
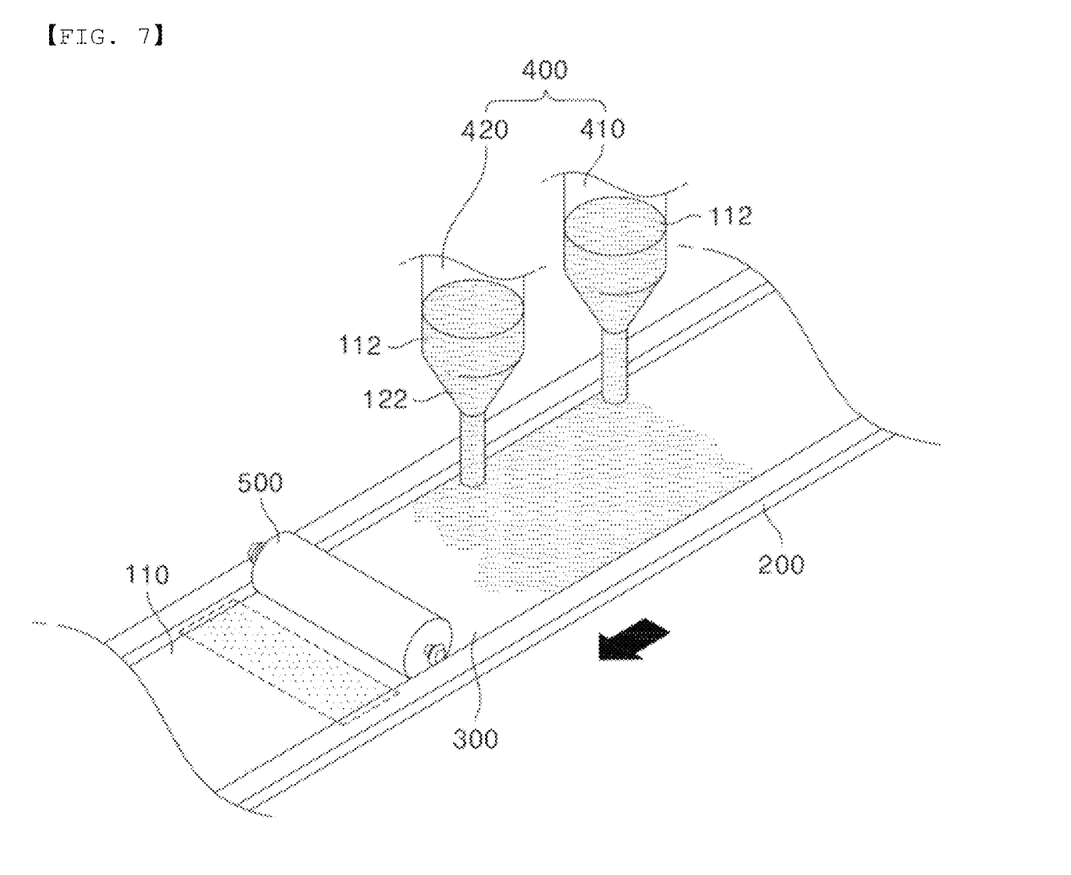
FIG. 7 is a schematic view of an apparatus for manufacturing the HV busbar according to the first preferred embodiment of the present invention.

FIG. 6 is a flowchart illustrating a method of manufacturing the HV busbar according to the first preferred embodiment of the present invention, and FIG. 7 is a schematic view of an apparatus for manufacturing the HV busbar according to the first preferred embodiment of the present invention.

The method of manufacturing the HV busbar according to the first embodiment of the present invention includes a first step of applying a predetermined temperature and pressure to first metal powder 112 while continuously supplying the first metal powder to form a first metal plate 110, a second step of applying a predetermined temperature and pressure to a metal powder mixture of first metal powder 112 and second metal powder 122 while continuously supplying the metal powder mixture for a predetermined time to form a second metal plate 120, a third step of applying a predetermined temperature and pressure to first metal powder 112 while continuously supplying the first metal powder to form a first metal plate 110, thereby preparing a conductor, a fourth step of cutting the prepared conductor to a predetermined length, and a fifth step of coating the remaining surfaces of the conductor excluding opposite edges thereof with an insulative resin.

The busbar manufacturing apparatus according to the present invention may include a conveyor belt 200, a tray 300, a metal particle supply tank 400, a roller 500, and a heating means (not shown).

Specifically, in the first step, first metal powder 112 in a first supply tank 410 is continuously supplied to the tray 300, which is located on the conveyor belt 200, and at the same time the first metal powder is heated to a predetermined temperature while the first metal powder is pressed using the roller 500 to form a first metal plate 110 corresponding to a flat non-cutting region.

In the second step, supply of the first metal powder 112 from the first supply tank 410 is temporarily interrupted, and a metal powder mixture of first metal powder 112 and second metal powder 122 in a second supply tank 420 is heated and pressed using the roller 500 while the metal powder mixture is continuously supplied to the tray 300 to form a second metal plate 120 corresponding to a flat cutting region.

Here, the particle size of the second metal powder 122 may be changed depending on the target rupture current amount of an HV busbar 100. As an example, the particle size of each of the first metal powder 112 and the second metal powder 122 may range from several nm to several mm. It is preferable that the particle size of the second metal powder 122 be greater than the particle size of the first metal powder 112. The particle size of the second metal powder 122 may be 2 to 10 times the particle size of the first metal powder 112. That is, the particle size of the first metal powder 112, which has a relatively high melting point, is reduced in order to adjust sintering temperatures of the first metal powder 112 and the second metal powder 122 so as to be similar to each other. In the case in which the sintering temperatures of the first metal powder 112 and the second metal powder 122 are similar to each other, the particle size ratio therebetween is not limited to the above-defined particle size ratio.

In addition, the heating temperature in the first step and the second step is not particularly restricted. Any temperature capable of sintering the first metal powder 112 and the second metal powder 122 depending on the particle sizes of the first metal powder and the second metal powder is allowed.

In the third step, the supply of the metal powder mixture from the second supply tank is temporarily interrupted, and first metal powder 112 in the first supply tank 410 is pressed and heated while the first metal powder is continuously supplied to the tray 300 to form a first metal plate 110 corresponding to a non-cutting region.

After the first to third steps are performed, there is formed a conductor configured such that the second metal plate 120, which is made of the mixture of the first metal powder 112 and the second metal powder 122 and which corresponds to the cutting region, is provided in the middle and such that a pair of first metal plates 110, each of which is made of only the first metal powder 112 and each of which corresponds to the non-cutting region, are provided at opposite sides of the second metal plate 120.

The fourth step is a step of cutting the prepared conductor to an appropriate length in consideration of the distance between battery modules to be connected to each other.

The fifth step is a step of uniformly forming a coating layer on the outer surface of the conductor using a thermosetting resin that exhibits high insulation, such as an epoxy resin or a polyester resin. Here, it is preferable to form the coating layer using a spray coating method. The reason for this is that, when the spray coating method is used, it is possible to easily adjust the thickness of the coating layer and to reduce coating time. The coating layer forming process corresponds to known technology, and therefore a detailed description thereof will be omitted.

Meanwhile, a step of bending the HV busbar 100 to a predetermined shape may be further included. Specifically, the bending step may be performed after cutting in the fourth step or after the coating layer is formed. However, it is preferable for the bending step to be performed before the coating layer is formed. The reason for this is that, in the case in which the HV busbar is bent after the coating layer is formed, a portion of the coating layer may be loosened and the surface of the coating layer at the bent portion is not smooth.

Next, a method of manufacturing the HV busbar according to the second embodiment of the present invention described above will be described.

Figure 8:
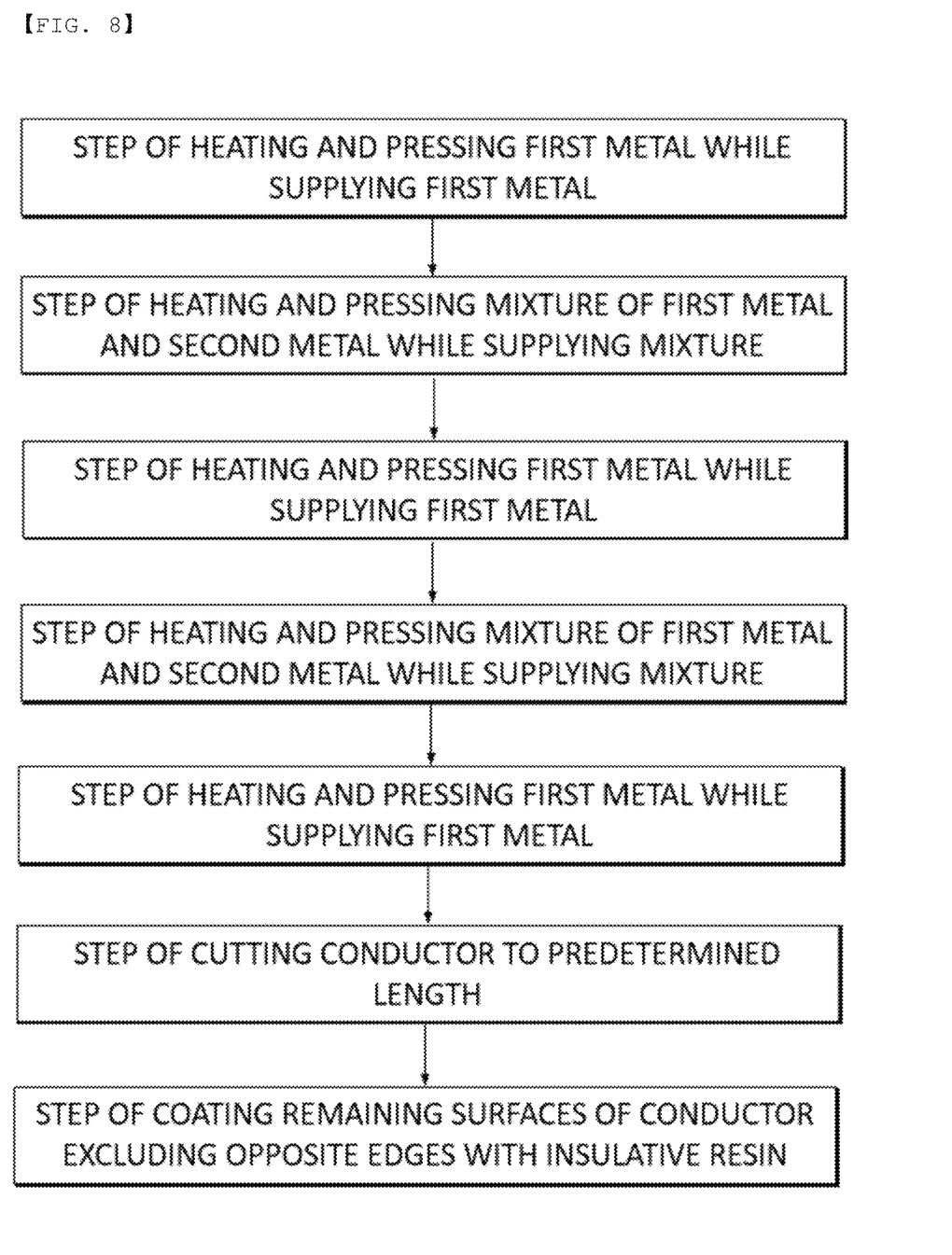
FIG. 8 is a flowchart illustrating a method of manufacturing the HV busbar according to the second preferred embodiment of the present invention.
Figure 9:
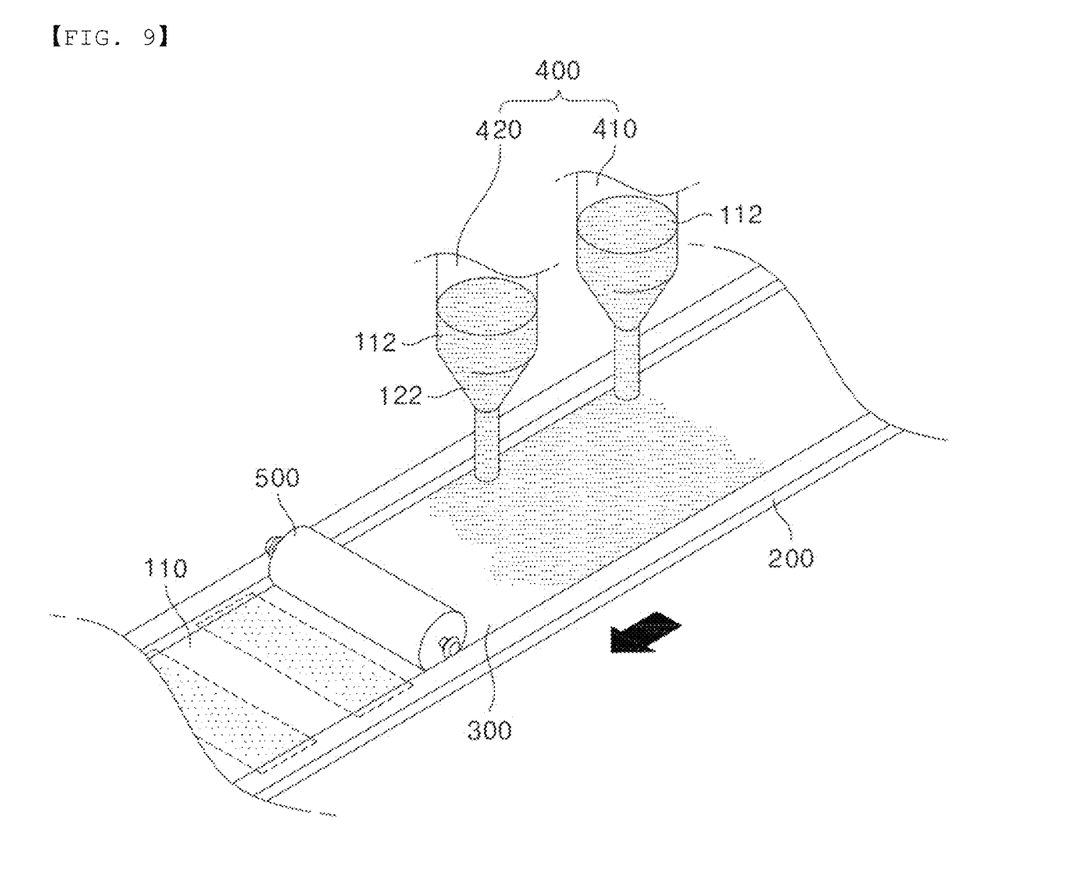
FIG. 9 is a schematic view of an apparatus for manufacturing the HV busbar according to the second preferred embodiment of the present invention.

FIG. 8 is a flowchart illustrating a method of manufacturing the HV busbar according to the second preferred embodiment of the present invention, and FIG. 9 is a schematic view of an apparatus for manufacturing the HV busbar according to the second preferred embodiment of the present invention.

As shown in FIGS. 8 and 9, the method of manufacturing the HV busbar according to the second embodiment of the present invention includes a first step of applying a predetermined temperature and pressure to first metal powder 112 while continuously supplying the first metal powder to form a first metal plate 110, a second step of applying a predetermined temperature and pressure to a metal powder mixture of first metal powder 112 and second metal powder 122 while continuously supplying the metal powder mixture for a predetermined time to form a second metal plate 120, a third step of applying a predetermined temperature and pressure to first metal powder 112 while continuously supplying the first metal powder to form a first metal plate 110, a fourth step of applying a predetermined temperature and pressure to a metal powder mixture of first metal powder 112 and second metal powder 122 while continuously supplying the metal powder mixture for a predetermined time to form a second metal plate 120, a fifth step of applying a predetermined temperature and pressure to first metal powder 112 while continuously supplying the first metal powder to form a first metal plate 110, thereby preparing a conductor, a sixth step of cutting the prepared conductor to a predetermined length, and a seventh step of coating the remaining surfaces of the conductor excluding opposite edges thereof with an insulative resin.

The manufacturing method according to the second embodiment is identical to the manufacturing method according to the first embodiment described above except that two second metal plates 120 are provided and a first metal plate 110 is further provided between the second metal plates 120. That is, the fourth step and the fifth step are repetitions of the second step and the third step, and another second metal plate 120 is formed through the fourth step and the fifth step.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: HV busbar
110: First metal plate
111: First metal 112: First metal powder
120: Second metal plate
121: Second metal 122: Second metal powder
130: Pore
140: Rupture portion
200: Conveyor belt
300: Tray
400: Metal particle supply tank
410: First supply tank
420: Second supply tank
500: Roller

The invention claimed is:

1. A busbar configured to connect a plurality of battery modules to each other, the busbar comprising:
   a conductor comprising at least one first metal plate and a second metal plate having a different composition than the at least one first metal plate; and
   an insulative resin coating layer on an outer circumferential surface of the conductor,
   wherein the at least one first metal plate comprises a first metal and the second metal plate comprises a plurality of particles of a second metal dispersed within the first metal, the second metal having a lower melting point than the first metal.

2. The busbar according to claim 1, wherein an upper surface and a lower surface of each of the particles of the second metal are exposed out of the second metal plate, and a side surface of each of the particles of the second metal is in contact with the first metal.

3. The busbar according to claim 2, wherein the particles of the second metal have different outer surface areas.

4. The busbar according to claim 3, wherein, when heated to a predetermined temperature or higher, the particles of the second metal are melted, whereby a sectional area of the second metal plate is reduced.

5. The busbar according to claim 4, wherein, when heated to a predetermined temperature or higher, a rupture portion is formed in the second metal plate.

6. The busbar according to claim 1, wherein the first metal is copper or aluminum, and the second metal comprise at least one of indium (In) and tin (Sn).

7. The busbar according to claim 1, wherein the at least one first metal plate is two first metal plates,
   the second metal plate is a singular plate, and
   the second metal plate is located between the first metal plates.

8. The busbar according to claim 7, wherein the first metal plates and the second metal plate are alternately located in a longitudinal direction, and
   the first metal plates are located at opposite edges in the longitudinal direction.

9. A method of manufacturing the busbar according to claim 1, the method comprising:
   applying a predetermined temperature and pressure to first metal powder while continuously supplying the first metal powder to form the at least one first metal plate;
   applying a predetermined temperature and pressure to a metal powder mixture of first metal powder and second metal powder while continuously supplying the metal powder mixture for a predetermined time to form the second metal plate; and
   applying a predetermined temperature and pressure to the first metal powder while continuously supplying the first metal powder to form the at least one first metal plate, thereby preparing a conductor.

10. The method according to claim 9, wherein the first metal powder is copper or aluminum, and
    the second metal powder is an alloy of indium (In) and tin (Sn).

11. The method according to claim 10, wherein a particle size of the second metal powder is greater than a particle size of the first metal powder.

12. The method according to claim 9, further comprising:
    cutting the conductor to a predetermined length; and
    coating remaining surfaces of the conductor excluding opposite edges thereof with an insulative resin.

13. A battery pack comprising the HV busbar according to claim 1.

* * * * *